Figure 3:
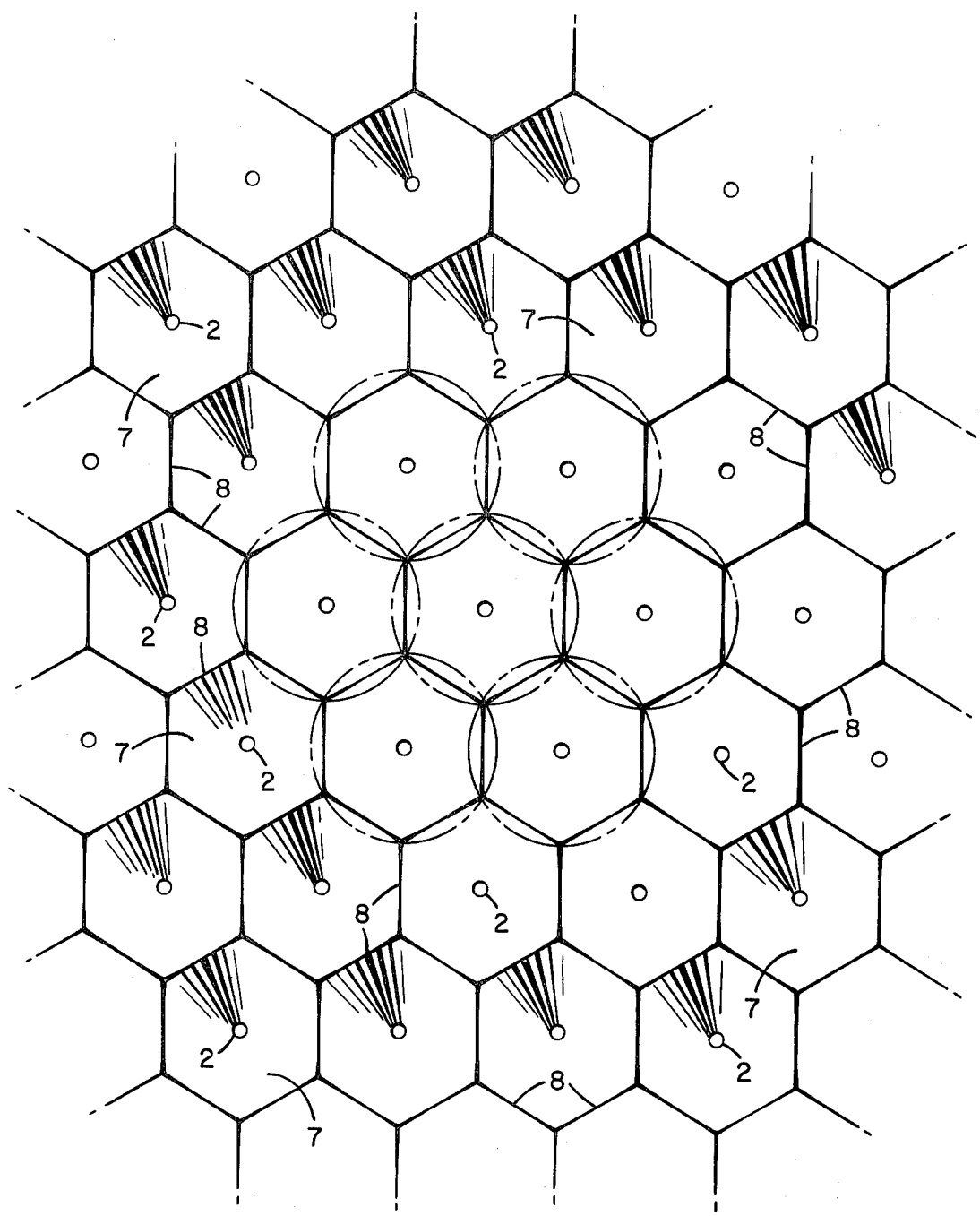

United States Patent [19]

Driessen et al.

[11] 4,114,525

[45] Sep. 19, 1978

[54] DEVICE FOR GENERATING SHEARING FORCES IN TREATING YOGURT AND OTHER VISCOUS LIQUIDS OR GELS

[75] Inventors: Frans M. Driessen, Bennekom; Jacob Ubbels, Ede; Jacobus J. Stadhouders, Bennekom, all of Netherlands

[73] Assignee: Stichting Bedrijven Van Het Nederlands Instituut Voor Zuivelonderzoek, Ede, Netherlands

[21] Appl. No.: 763,549

[22] Filed: Jan. 28, 1977

[51] Int. Cl.² .............................................. A01J 11/00
[52] U.S. Cl. ...................................... 99/465; 241/94; 366/332
[58] Field of Search ................. 99/460, 461, 465, 466, 99/306, 458, 503, 508, 513; 259/4 R, 27, 47, 113; 209/346, 397, 399; 241/94, 84.4, 91, 212

[56] References Cited

U.S. PATENT DOCUMENTS

| | | | |
|---|---|---|---|
| 1,836,541 | 12/1931 | Meyer | 99/306 |
| 1,889,543 | 11/1932 | Coors | 99/306 |
| 1,916,393 | 7/1933 | Smith | 209/397 |
| 220,578 | 10/1879 | Cormack | 241/94 X |
| 2,615,692 | 10/1952 | Muller | 259/113 |
| 2,948,920 | 8/1960 | Hausman | 259/47 X |

FOREIGN PATENT DOCUMENTS

| | | | |
|---|---|---|---|
| 119,435 | 4/1901 | Fed. Rep. of Germany | 241/84.4 |
| 537,667 | 1/1956 | Italy | 259/4 R |

*Primary Examiner*—Philip R. Coe
*Attorney, Agent, or Firm*—Fleit & Jacobson

[57] ABSTRACT

A device for generating shearing forces in yogurt and other viscous liquids or gels being treated. The device uses a movable plate having openings that diverge at least over part of their length and at least in one axial direction. The diverging openings terminate at one end face of the plate to as to define a plate surface which consists entirely or substantially of intersecting lines formed by the ends of the diverging openings.

7 Claims, 3 Drawing Figures

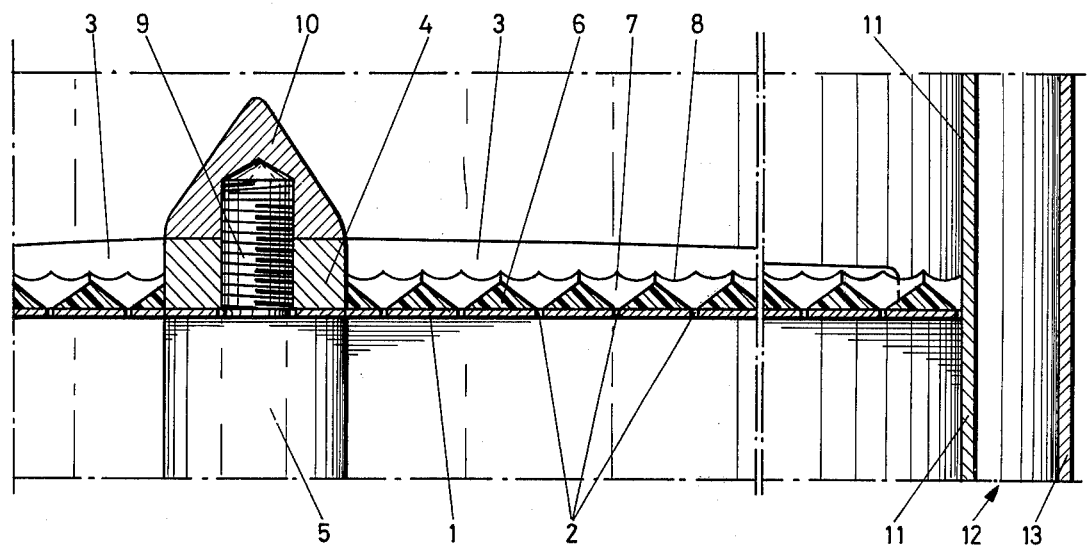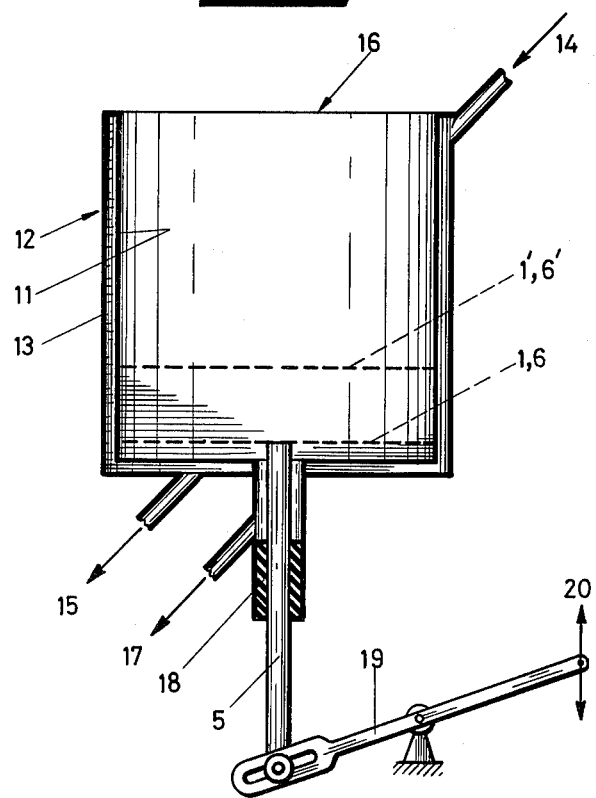

DEVICE FOR GENERATING SHEARING FORCES IN TREATING YOGURT AND OTHER VISCOUS LIQUIDS OR GELS

The present invention relates to a device for generating shearing forces in treating yogurt and other viscous liquids or gels in a container by means of a movable plate with openings.

The invention aims at perfecting what is given in U.S. Pat. Nos. 3,924,007 and 3,946,657 to Driessen et al, assigned to the same assignee. In said specifications prefermented milk is introduced into a coagulation vessel to be transferred therein into a coagulated condition and in the lower part of such a vessel there should be limited and controlled stirring for exerting shearing forces on the yogurt or the like to influence the structure of the product thereby. To this end it has been given in said older patents that in the lower part of said coagulation vessel a horizontal plate with openings may be present, which, when stirring has to take place, is moved upwardly through the coagulated milk at a rather high speed, so that said milk is caused to flow through the openings in said plate. After this upward movement said plate returns downwardly very slowly, substantially at the same speed as the speed, with which the acidifying milk flows downwardly in the vessel. By the stirring a smooth structure is obtained without too much decrease of the viscosity. To obtain this the downwardly directed speed of the plate may not be too high, and on the other hand, in order to obtain the said smooth structure, said speed may neither be too low when the plate moves upwardly. The upwardly directed speed is chosen in coherence with the cross-sectional area of the openings in the plate and their number per unit surface area.

The vessel usually has smooth walls coated with a friction decreasing agent or layer and the plate may be sealed along its periphery in the vessel with respect to the wall thereof.

A disadvantage of such a flat plate with openings is that particles of yogurt may remain positioned on the top surface of the plate between the openings so that they may cure or harden in such positions. On continued use of the apparatus, small lumps of such cured yogurt may be released. This causes an undesired and non-smooth structure of the yogurt and said lumps may also clog or jam the openings, by which the desired vertical flow through the openings is disturbed and the plate has to be cleaned frequently.

The invention aims at improving this and to this end a device as given in the preamble above is according to the invention characterized in that the openings at least over part of their length and at least in one direction along the axes of said openings diverge and that in said direction the outer limit of said plate consists entirely or substantially of the intersecting lines of the said diverging openings. In this way no plane parts of the plate remain, on which during the stirring yogurt parts or the like could stay back. It is sufficient to have such a divergence in one direction, which in the described device according to said previous patents will be a divergence upwardly for forming an upper surface of the plate with curved intersecting lines as indicated.

Preferably each opening is widened according to a straight circular cone, which is particularly of advantage if the openings have to be formed by a machining or cutting operation.

The plate may consist of metal or of a synthetic or plastic material. In some cases it is preferable to realize the invention in such a way that the plate is built up from a strong thin plate and from a thicker plate from a different material. The thinner plate may be a metal plate in which the openings have been made e.g. by drilling, while on said plate a thicker plastic plate is applied which may easily be formed plastically or in another manner with diverging openings of any desired shape.

It will be clear that the end face of the plate with diverging openings, formed by the intersecting edges of said openings, will usually not be a flat surface. For diverging openings in the shape of straight circular cones said face will consist entirely or almost entirely of curved intersecting lines, which in the imaginary connecting planes through the axes of adjacent openings will be lower than in other points, so that the plate will not have the same thickness throughout.

The invention is not limited to horizontal plates moving vertically. It would also be possible to apply a closed vessel with non-vertical flow of the liquid therethrough, so that the plate according to the invention has to be positioned therein in a vertical position or in an inclined position and has to be moved in a non-vertical axial direction of the vessel for exerting the shearing forces.

The invention will now be explained in more detail with reference to the enclosed drawings, which by way of example only, show:

in FIG. 1 a partial vertical section through a movable plate according to the invention, in FIG. 2 a somewhat digrammatic vertical section of a container such as a coagulating tank for yogurt with such a plate, and in FIG. 3 a partial, enlarged top view of the movable plate of FIG. 1, with solid lines illustrating the lines of intersection separating the openings formed by the cones, some of the bases of the cones being illustrated in phantom.

A rather thin metal plate 1, e.g. with a thickness of 3 mm, has a number of openings or passageways 2 of a circular cylindrical shape, e.g. obtained by drilling. These openings e.g. have a diameter of 2.5 mm and are provided in a triangular pattern with a pitch of e.g. 15 mm. This plate is supported by several supporting ribs 3, e.g. four in number, connecting the plate to a hub 4 in the center, supported by a spindle 5, which may extend through the bottom of the vessel to be driven in an up and down movement by external driving means. In the drawings said ribs 3 are provided at the top side of the plate, so that it is possible to move the plate downwardly to a position quite close to the substantially flat bottom of the vessel.

Instead of a single spindle 5 and hub 4 there may be a plurality of such parts, which e.g. may each extend separately through the bottom of the vessel and be connected outside the vessel to a common structure moved up and down by the driving means.

On the metal plate 1 a thicker plate of plastic material is provided, connected intimately to the metal plate 1. This plastic plate is indicated by 6 and it has openings or passageways 7 in the shape of a straight circular cone each immediately joining an opening 2. The cone angle of the openings 7 may e.g. be between 80° and 120°, and for yogurt it is preferably 100°. The diverging walls of the openings thus formed intersect each other and thus, as shown in FIG. 3, form the curved upper edges 8 of the plastic plate 6, so that no yogurt particles can remain positioned on the top surface of the plate. Said curved upper edges 8 will for the pattern of the openings as mentioned above form regular hexagons as seen from above, the corners of such hexagons forming the highest points thereof.

It is possible to manufacture the plate 6 separately from the plate 1 and thereafter to bond it thereto, but it may be preferable to mould said plastic plate immediately on the metal plate 1, e.g. before drilling the holes 2, after which forming the holes 2 will be drilled in the bottoms of the openings 7.

In the example shown the ribs 3 terminate at some distance inwardly from the wall 11 of the vessel, so that the plastic plate 6 may form a unity as the quadrants thereof are united near their outer periphery radially outside the ribs 3.

The spindle 5 carrying the plate may have a screw-threaded extension 9, around which the hub 4 fits. The hub 4 may be connected to the plate 1 e.g. by welding. On top of the hub 4 a screw cap 10 may be screwed onto the extension 9, which cap keeps the plate in position with respect to the spindle and said cap is preferably conical with a rather sharp point to prevent yogurt particles to remain positioned thereon.

The plastic material applied for plate 6 may e.g. be hard polyvinylchloride.

This plate is used in a container as shown diagrammatically in FIG. 2. This container 12 has double walls 11, 13 to allow passing a fluid such as water through the jacket thus formed to keep the temperature in the container at a desired constant value. This fluid may be introduced at 14 and discharged at 15. For details we refer to the two United States' patent specifications indicated above. Arrow 16 shows that the liquid to be treated such as prefermented milk is introduced from above. At the bottom of container 12 it has a discharge pipe at 17 for the discharge of the yogurt or other end product of the treatment in this container. There are valves not shown in supply and discharge to control the flow of the liquid in the container. For the necessary stirring of the contents of the container it has the movable plate 1, 6, shown in FIG. 1, mounted on the rod 5, which extends sealingly through a packing gland 18 to a pivoting lever 19 operated at 20 to move the plate 1, 6 up and down between a position 1, 6 near the bottom of the container to a position 1', 6', both as shown in FIG. 2. This plate 1, 6 has to move upwardly at high speed when stirring is necessary to apply shearing forces to the liquid in the tank and has to move downwardly very slowly, substantially at the same speed as this liquid when this flows downwardly, the liquid below the plate 1, 6 leaving the container at 17.

What is claimed is:

1. A device for generating shearing forces in yogurt and other viscous liquids or gels being treated comprising:
    a container for material being treated; and
    a plate positioned in and movable with respect to said container and having an axis, a first end face, a second end face, and passageways defined therein and extending axially between said first and said second end faces, each of said passageways having a divergent end and a diverging portion extending over at least part of the length of the passageway and terminating at said divergent end, the divergent ends of each of said passageways intersecting with the divergent ends of adjacent passageways, said first end face being defined substantially by the intersecting divergent ends of said passageways.

2. A device according to claim 1, characterized in that each passageway diverges by a straight circular conical shape.

3. A device according to claim 2, characterised in that said first end face has an uneven contour, highest portions of said contour being formed where divergent ends of three adjacent conical shaped diverging passageways intersect.

4. A device according to claim 1, characterised in that the plate is built up from a strong thin plate and a thicker plate in which said diverging portion of the passageways is formed from another material.

5. A device according to claim 4, characterised in that the passageways diverge in one direction and in that the passageways include narrower portions formed in the thin plate.

6. A device according to claim 1, further comprising means for axially moving the plate in a direction substantially parallel to the axial direction of the passageways.

7. A device according to claim 1, characterised in that the end face of said plate where said diverging passageways, terminate is substantially free from planar sections.

* * * * *